Jan. 13, 1970

L. V. ROWE 3,489,139

THERAPEUTIC VIBRATOR DEVICE

Filed March 28, 1967

INVENTOR

LOWELL VERNON ROWE

BY Jennings Bailey Jr.

ATTORNEY

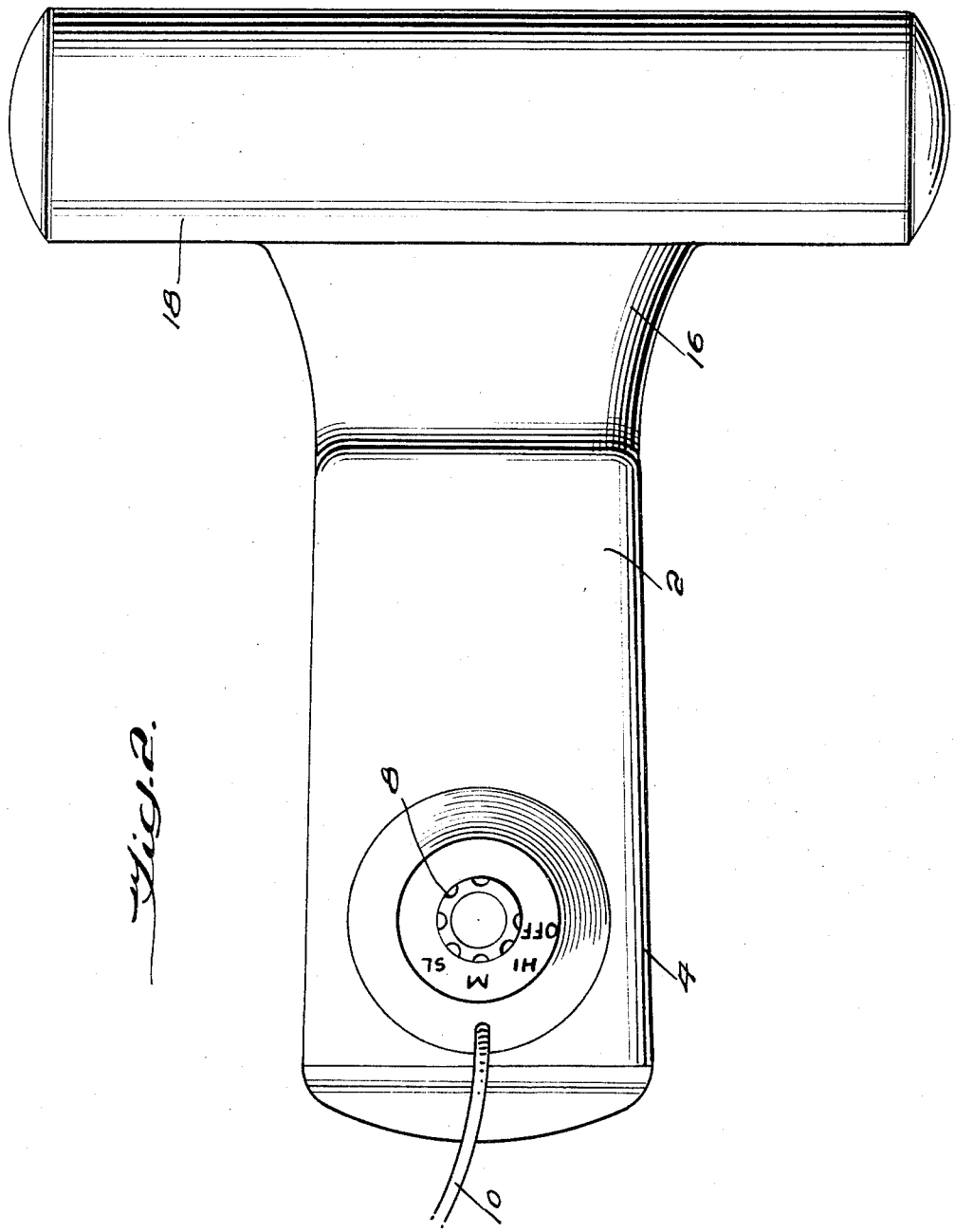

United States Patent Office 3,489,139
Patented Jan. 13, 1970

3,489,139
THERAPEUTIC VIBRATOR DEVICE
Lowell V. Rowe, 1605 Central Ave., Hot Springs
National Park, Ark. 71901
Filed Mar. 28, 1967, Ser. No. 626,631
Int. Cl. A61h 1/00
U.S. Cl. 128—36           6 Claims

ABSTRACT OF THE DISCLOSURE

A casing containing a motor with an eccentric weight carried on its shaft is provided with a projection from the end in which the eccentric weight is located capable of fitting under the cushion or arm rest of an automobile seat so as to impart vibrations to the seat.

FIELD OF THE INVENTION

Figure 1:
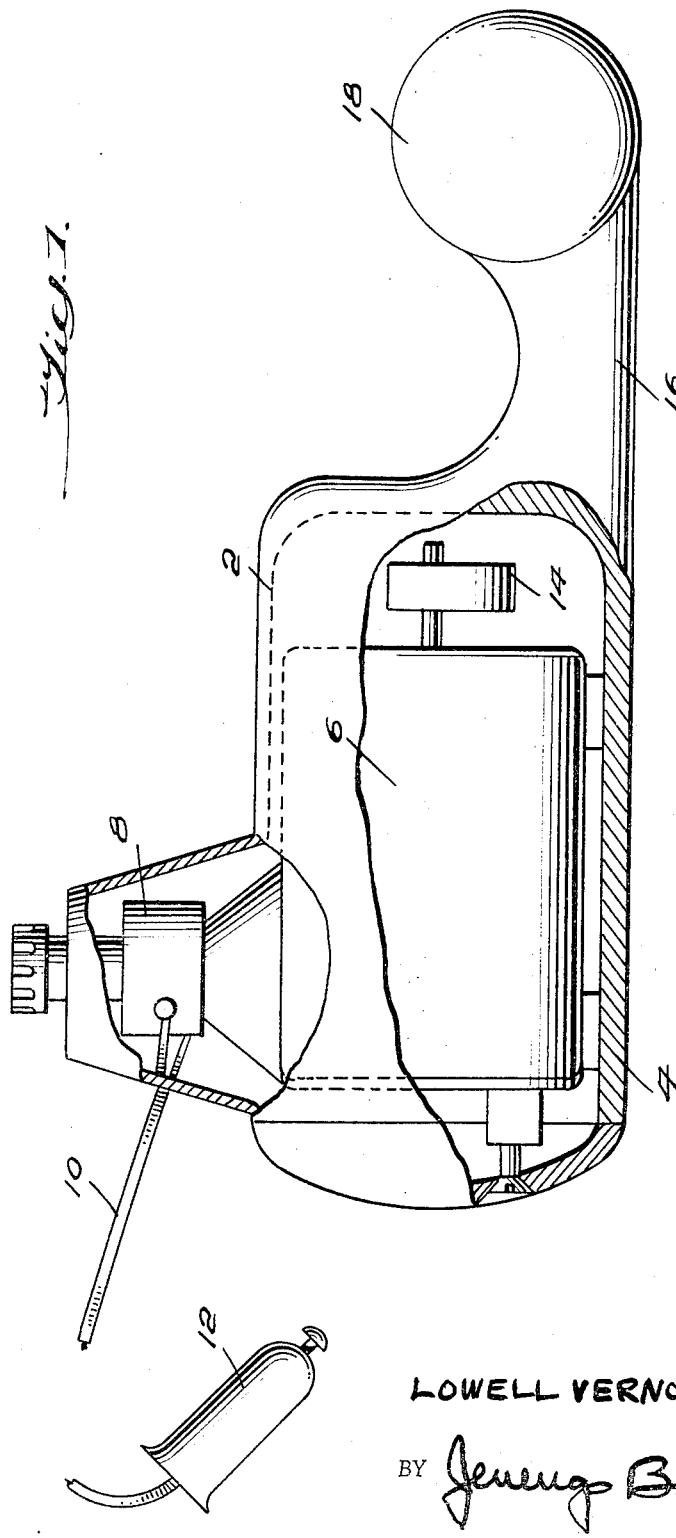

The invention relates to a device for imparting vibrations to the seat of an automobile for the purpose of transmitting such vibrations to the driver or passengers.

PRIOR ART

It has been heretofore known to connect vibrating devices to seats, beds or the like. However, so far as I am aware, none of these devices has been such that it could be inserted removably into an automobile seat.

The object of the invention is to furnish a simple and inexpensive vibrating device capable of insertion under a back cushion or arm rest of an automobile to impart vibrations to the driver and passenger.

SUMMARY OF THE INVENTION

The invention includes a casing in which is secured an electric motor having a shaft with an eccentric weight thereon. The casing has a substantially flat bottom and an extension at that end of the casing in which the eccentric weight is located. This extension has an upwardly curved end portion of substantial thickness of generally circular shape in cross-section for fitting under the back cushion or arm rest.

This invention has a practical purpose in todays world; especially due to the fast pace man has found himself in. With the millions of miles that we all travel by automobile annually, and the long strenuous hours that some have to spend behind the wheel, the following is the significance of this invention.

This device will help prevent highway hypnosis of dozing at the wheel. It has three speeds; Hi—Med—Low. The Hi speed has a stimulating massage action which could increase body circulation and arouse alertness, thus preventing a serious accident.

There are two types of drivers. One who has a tendency after a few miles of driving to become drowsy. Another, the longer they drive the more tense they become. The medium or low speed induces a very mild and soothing vibrating massage action which tends to relax the driver, which could prevent a serious accident.

Because of the portability of the device, it can easily be removed, put on the floor of the car and used as a foot vibrator during rest periods or for other occupants of the car while in travel.

Another significant feature of the device is the simplicity of installation. Maximum vibration is in the tail of the unit.

Another significant feature is the size, since it is very compact and fits in the center of the seat. Vibration is evenly and consistently distributed over the entire seat as well as the back rest. This device could also be used in the home as a foot vibrator, or for general use provided a converter device of A.C. current to D.C. current was used.

In the drawings:
FIGURE 1 shows inside elevation, partly in section, a device embodying the invention; and
FIGURE 2 is a top plan view thereof;

DESCRIPTION OF THE PREFERRED EMBODIMENT

The device comprises a casing 2 having a straight bottom wall 4. Within the casing is mounted an electric motor 6 capable of being driven by an automobile battery and provided with a control switch 8 connected by an electric cord 10 having at its end a plug 12 adapted to fit in an electric lighter socket so as to derive current for operating the motor.

The motor shaft carries at one end an eccentric weight 14 for causing the motor and thereby the casing to vibrate when the motor is energized.

The casing has an extension 16 at the same end as the weight 14, this extension being parallel to the axis of the motor shaft and being in general saddle-shaped. At the end of the extension is a bolster-shaped cross-member 18. The end portion 18 is substantially round in cross-section and its longitudinal axis is transverse to the axis of the motor shaft.

In use, the device is placed on the automobile seat and the bolster 18 is pushed back under the back cushion of the seat, the saddle 16 then engaging the lower edge of the cushion. When the motor is energized, the cushion will vibrate with the effects discussed above.

What is claimed is:
1. A vibrator for automobile seats comprising:
   a casing;
   a motor mounted in the casing;
   said motor having a shaft with an eccentric weight thereon;
   said casing having an extension thereon fittable beneath a back seat cushion to engage the lower edge thereof so as to impart vibrations thereto when the motor is energized;
   said extension extending in a direction substantially parallel to the motor shaft.
2. A vibrator as claimed in claim 1;
   said casing having a substantially straight bottom wall;
   said projection including a saddle-shaped portion, and an end portion of greater height than said saddle-shaped portion.
3. A vibrator as claimed in claim 2, said end portion being substantially round in cross-section with its longitudinal axis transverse to the axis of the shaft.
4. A vibrator as claimed in claim 3, said projection extending from the same end of the casing as the eccentric weight.
5. A vibrator as claimed in claim 2, said projection extending from the same end of the casing as the eccentric weight.
6. A vibrator as claimed in claim 1, said projection extending from the same end of the casing as the eccentric weight.

References Cited

UNITED STATES PATENTS

| | | | |
|---|---|---|---|
| 850,938 | 4/1907 | Kellogg | 128—36 |
| 2,512,621 | 6/1950 | Emerson | 128—33 |
| 2,589,322 | 3/1952 | Archer | 128—36 |
| 3,037,499 | 6/1962 | Cummins | 128—33 |

L. W. TRAPP, Primary Examiner